(12) United States Patent
Warnes et al.

(10) Patent No.: US 8,305,648 B2
(45) Date of Patent: Nov. 6, 2012

(54) ADJUSTING THE CALIBRATION OF AN IMAGING SYSTEM

(75) Inventors: Allan Warnes, North Vancouver (CA); Guy Sirton, Delta (CA)

(73) Assignee: Eastman Kodak Company, Rochester, NJ (US)

( * ) Notice: Subject to any disclaimer, the term of this patent is extended or adjusted under 35 U.S.C. 154(b) by 771 days.

(21) Appl. No.: 12/474,508

(22) Filed: May 29, 2009

(65) Prior Publication Data

US 2010/0305776 A1    Dec. 2, 2010

(51) Int. Cl.
*H04N 1/00* (2006.01)
(52) U.S. Cl. .......................................... 358/406; 347/14
(58) Field of Classification Search .............. 137/3, 139; 347/14, 56, 19, 15; 118/326, 682, 313; 427/8; 358/406, 109
See application file for complete search history.

(56) References Cited

U.S. PATENT DOCUMENTS

| | | | |
|---|---|---|---|
| 7,625,057 B2 * | 12/2009 | Koase | 347/14 |
| 8,033,632 B2 * | 10/2011 | Koase | 347/19 |
| 2001/0050760 A1 | 12/2001 | Uemura et al. | |
| 2005/0243120 A1 | 11/2005 | Detmers et al. | |
| 2006/0246212 A1 * | 11/2006 | Takahashi et al. | 427/8 |
| 2007/0070109 A1 * | 3/2007 | White et al. | 347/19 |
| 2007/0139455 A1 * | 6/2007 | Iriguchi | 347/14 |
| 2007/0261636 A1 * | 11/2007 | Rangarajan et al. | 118/326 |
| 2008/0018708 A1 * | 1/2008 | Silverbrook | 347/56 |
| 2008/0143769 A1 * | 6/2008 | Koase | 347/14 |
| 2008/0150978 A1 * | 6/2008 | Sato et al. | 347/9 |
| 2008/0174619 A1 * | 7/2008 | Katsumura | 347/9 |
| 2008/0299470 A1 | 12/2008 | Cummings et al. | |
| 2010/0163111 A1 * | 7/2010 | Tajima | 137/3 |

FOREIGN PATENT DOCUMENTS

| | | |
|---|---|---|
| CA | 2 422 142 A1 | 1/2004 |
| DE | 103 40 382 A1 | 4/2004 |
| EP | 1 070 585 A1 | 1/2001 |
| WO | WO 2008/132528 A1 | 11/2008 |

* cited by examiner

*Primary Examiner* — Jerome Grant, II
(74) *Attorney, Agent, or Firm* — Nelson Adrian Blish (57) ABSTRACT

An apparatus (10) for adjusting the calibration of an imaging system to correct for geometric distortion comprises a rotating drum for receiving recording media (17), a plurality of carriages (18) each having an imaging head (16) with a plurality of addressable imaging channels, and a controller programmed with a lookup table, analytical relationship or algorithm that relates corrective adjustments to be made to the imaging of a given imaging head based on the positions of others of the imaging heads. A method is described for obtaining the lookup table, analytical relationship or algorithm. The method has particular relevance to large imaging systems.

8 Claims, 7 Drawing Sheets

ADJUSTING THE CALIBRATION OF AN IMAGING SYSTEM

FIELD OF THE INVENTION

The invention relates to imaging systems with multiple imaging heads for forming images on recording media. More particularly, the invention relates to alignment and calibration of such imaging systems.

BACKGROUND OF THE INVENTION

Various imaging systems are used to form images on recording media. For example, computer-to-plate systems (also known as CTP systems) are used to form images on printing plates. A plurality of imaged printing plates is subsequently provided to a printing press where images from the printing plate are transferred to paper or other suitable surfaces. It is important that the plurality of images be accurately aligned with respect to one another to ensure an accurate registration among the images. It is important that each image be geometrically correct and free from distortion to ensure desired quality characteristics of the finished printed article. Geometric characteristics of an image include but are not limited to: a desired size of an image portion or a desired alignment of one image portion with another image portion.

The geometric accuracy of the images formed on a recording media is dependent on numerous factors. For example, images are formed on a recording media by mounting the media on a support and directing imaging beams towards the media to form the images thereupon. Scanning the recording media with the imaging beams during a plurality of scans typically forms the images. The positioning accuracy of the imaging beams with respect to the recording media impacts the geometric correctness of the formed images. Deviations in required positioning of the imaging beams during each scan can lead to imaging errors.

In order to reduce imaging errors, imaging systems are typically calibrated. Test images are typically formed on recording media and are analyzed to determine deviations. Deviations associated with a desired geometric characteristic of a test image are typically corrected by performing various adjustments in the imaging systems. The adjustments can be electronic or mechanical in nature. Analysis of the test images is typically performed on specialized and dedicated equipment that can include various image sensors. For example, CCD sensors can be used to capture various images of the test images and a controller can be used to analyze the captured images and determine positional information therefrom.

Specialized and dedicated calibration systems are costly and require regular calibration themselves to insure their integrity. Such systems are typically employed at the factory where the imaging systems are manufactured. Factory based calibration systems complicate the calibration of an imaging system in the field. For instance, test images would need to be made in the field and then shipped to another site for analysis. This increases the time required for calibration and increases the chances for imaging errors to occur.

Co-pending U.S. Patent Publication 2008/0299470 shows a system and method for changing the calibration of an imaging machine to adjust for geometric distortion while the machine is serving in the field. The machine addressed by U.S. Patent Publication 2008/0299470 comprises a single imaging head.

There remains a need for effective and practical methods and systems that permit the calibration of imaging machines with multiple imaging heads to correct geometric distortions of images formed by such multiple-head imaging machines.

SUMMARY OF THE INVENTION

The present invention is a method for changing the calibration of an imaging system comprising a plurality of imaging heads. The method comprises adjusting the imaging of a first imaging head of the plurality of imaging heads based on a position of at least a second imaging head of the plurality of imaging heads. The first imaging head comprises a first plurality of addressable channels. Adjusting the imaging of the first imaging head can comprise one or more of adjusting the activation timing of at least one of the first plurality of channels, adjusting the speed of the first imaging head, and adjusting the position of the first imaging head.

The method of the invention comprises placing the second imaging head in a first position and determining a first adjustment to be made to the imaging of the first imaging head. This is then repeated for different positions of the second imaging head. Interpolation is used to obtain the adjustments that need to be made for positions of the second imaging head between those for which physical determinations are made. The adjustment made to the first imaging head, along with the position of the second imaging head, are entered in a lookup table that can be used to correct the imaging of the first imaging head.

The method can be extended to imaging apparatus with more than two imaging heads.

BRIEF DESCRIPTION OF THE DRAWINGS

Embodiments and applications of the invention are illustrated by the attached non-limiting drawings. The attached drawings are for purposes of illustrating the concepts of the invention and may not be to scale.

DETAILED DESCRIPTION OF THE INVENTION

Throughout the following description specific details are presented to provide a more thorough understanding to persons skilled in the art. However, well-known elements may not have been shown or described in detail to avoid unnecessarily obscuring the disclosure. Accordingly, the description and drawings are to be regarded in an illustrative, rather than a restrictive, sense.

Figure 1:
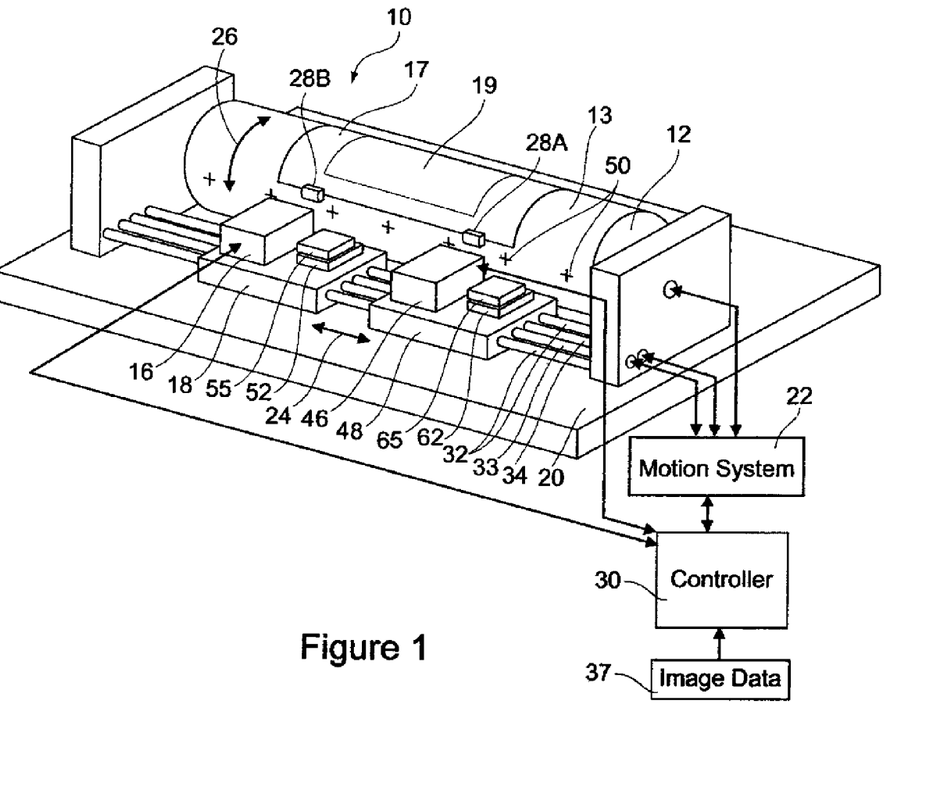
FIG. 1 is a partial schematic view of an imaging apparatus as per an example embodiment of the invention.

FIG. 1 schematically shows an apparatus 10 for forming an image 19A on a recording media 17 as per an example embodiment of the invention. Apparatus 10 includes a media support 12, which in this example includes an external drum configuration. Other example embodiments of the invention can include other forms of media supports such as internal drum configurations or flat surface configurations. Recording media 17 is supported on a surface 13 of media support 12. One or more edge portions of recording media 17 are secured to surface 13 by clamps 28A and 28B. Other example embodiments of the invention can secure recording media 17 to media support 12 by other methods, including but not limited to, providing a low-pressure source between the surface 13 and recording media 17.

Apparatus 10 includes imaging head 16, which is movable with respect to media support 12. In this example embodiment of the invention, imaging head 16 is mounted on movable carriage 18. Carriage 18 is moved with respect to support 20 in manner in which imaging head 16 is moved along a path aligned with an axis of the drum of media support 12. In this example embodiment of the invention, imaging head 16 moves along a path aligned with sub-scan axis 24.

Apparatus 10 includes at least one more imaging head 46, equipped with sensor 62 and illuminator 65, and which is movable with respect to media support 12. In this example embodiment of the invention, imaging head 46 is mounted on movable carriage 48. Carriage 48 is moved with respect to support 20 in a manner in which imaging head 46 is moved along a path aligned with an axis of the drum of media support 12. In this example embodiment of the invention, imaging head 46 moves along a path aligned with sub-scan axis 24.

Media support 12 rotates with respect to support 20. Motion system 22 is used to provide relative motion between imaging head 16 and media support 12. Motion system 22 (which can include one or more motion systems) can include any suitable prime movers needed for the required motion. In this example embodiment of the invention, motion system 22 is used to move media support 12 along a path aligned with main-scan axis 26 while moving imaging head 16 and imaging head 46 along paths aligned with sub-scan axis 24. Guide system 32 is used to guide carriage 18 and carriage 48, which are both moved independently. Carriage 18 is moved under the influence of transmission member 33 and carriage 48 is moved under the influence of transmission member 34. In this example embodiment of the invention, transmission members 33 and 34 include precision lead screws. Those skilled in the art will realize that other forms of motion can be used in accordance with the present invention. For example, imaging heads 16 and 46 can be stationary while media support 12 is moved. In other cases, media support 12 is stationary and imaging heads 16 and 46 are moved. In still other cases, the imaging heads 16 and 46, as well as the media support 12, are moved. Imaging heads 16 and 46 on the one hand, or media support 12 on the other, or all three, can reciprocate along corresponding paths. Separate motion systems can also be used to operate different systems within apparatus 10.

Imaging heads 16 and 46 comprise radiation sources (not shown), such as lasers. Imaging heads 16 and 46 are controllable to direct one or more imaging beams 21 (shown in FIG. 5A for imaging head 16) capable of forming image 19A on recording media 17. Imaging beams 21 generated by imaging head 16 are scanned over recording media 17 while imagewise modulated according to image data specifying the image to be written. One or more imaging channels are driven appropriately to produce imaging beams 21 with active intensity levels wherever it is desired to form an image portion. Imaging channels not corresponding to the image portions are driven so as not to image corresponding areas. Imaging head 46 is operated in the same way.

Image 19A can be formed on recording media 17 by different methods. For example, recording media 17 can include an image modifiable surface, wherein a property or characteristic of the modifiable surface is changed when irradiated by an imaging beam to form an image. An imaging beam can be used to ablate a surface of recording media 17 to form an image. An imaging beam can be used to facilitate a transfer of an image forming material to a surface of recording media 17 to form an image. Imaging heads 16 and 46 can include pluralities of channels that can be arranged in an array. An array of imaging channels can include a one-dimensional or two-dimensional array of imaging channels. An imaging beam can traverse a direct path from a radiation source to the recording media or can be deflected by one or more optical elements towards the recording media.

Groups of channels can form an image swath having a width related to the distance between a first pixel imaged and a last pixel imaged during a given scan. Recording media 17 is typically too large to be imaged within a single imaged swath. Multiple imaged swaths are typically formed to complete an image on recording media 17.

Controller 30, which can include one or more controllers is used to control one or more systems of apparatus 10 including, but not limited to, various motion systems 22 used by media support 12 and carriages 18 and 48. Controller 30 can also control media handling mechanisms that can initiate the loading or unloading of media 17 to and from media support 12, respectively. Controller 30 can also provide image data 37 to imaging heads 16 and 46 and control imaging heads 16 and 46 to emit imaging beams 21 in accordance with this data. Various systems can be controlled using various control signals or implementing various methods. Controller 30 is programmable and can be configured to execute suitable software and can include one or more data processors, together with suitable hardware, including by way of non-limiting example: accessible memory, logic circuitry, drivers, amplifiers, A/D and D/A converters, input/output ports and the like. Controller 30 can comprise, without limitation, a microprocessor, a computer-on-a-chip, the CPU of a computer or any other suitable microcontroller. Controller 30 can be associated with a materials handling system, but need not necessarily be, the same controller that controls the operation of the imaging systems.

In larger machines in particular, guide systems 32 and the transmission members 33 and 34 are long and can deflect significantly under the weight of imaging heads 16 and 46. The geometric correction of a first imaging head 16 of the system is, therefore, affected by the position of a second imaging head 46. Thus, while the intended motion of the two imaging heads 16 and 46 can very well be independent, the positioning and orientation errors induced in the actual positioning and orientation of the first imaging head 16 by the positioning of the second of the imaging heads 46 are significant and, for a given position of the first imaging head 16, have to be compensated for all possible positions of the second imaging head 46.

Thereupon the procedure is repeated for second imaging head 467 the errors of which have to be compensated for as a function of the position of first imaging head 16.

A representative set of positions for each of the imaging heads can be selected and the geometric correction can be performed for those positions of the two imaging heads 16 and 46. The corrections for positions between the selected ones can then be obtained to a good approximation by interpolation.

Figure 2:
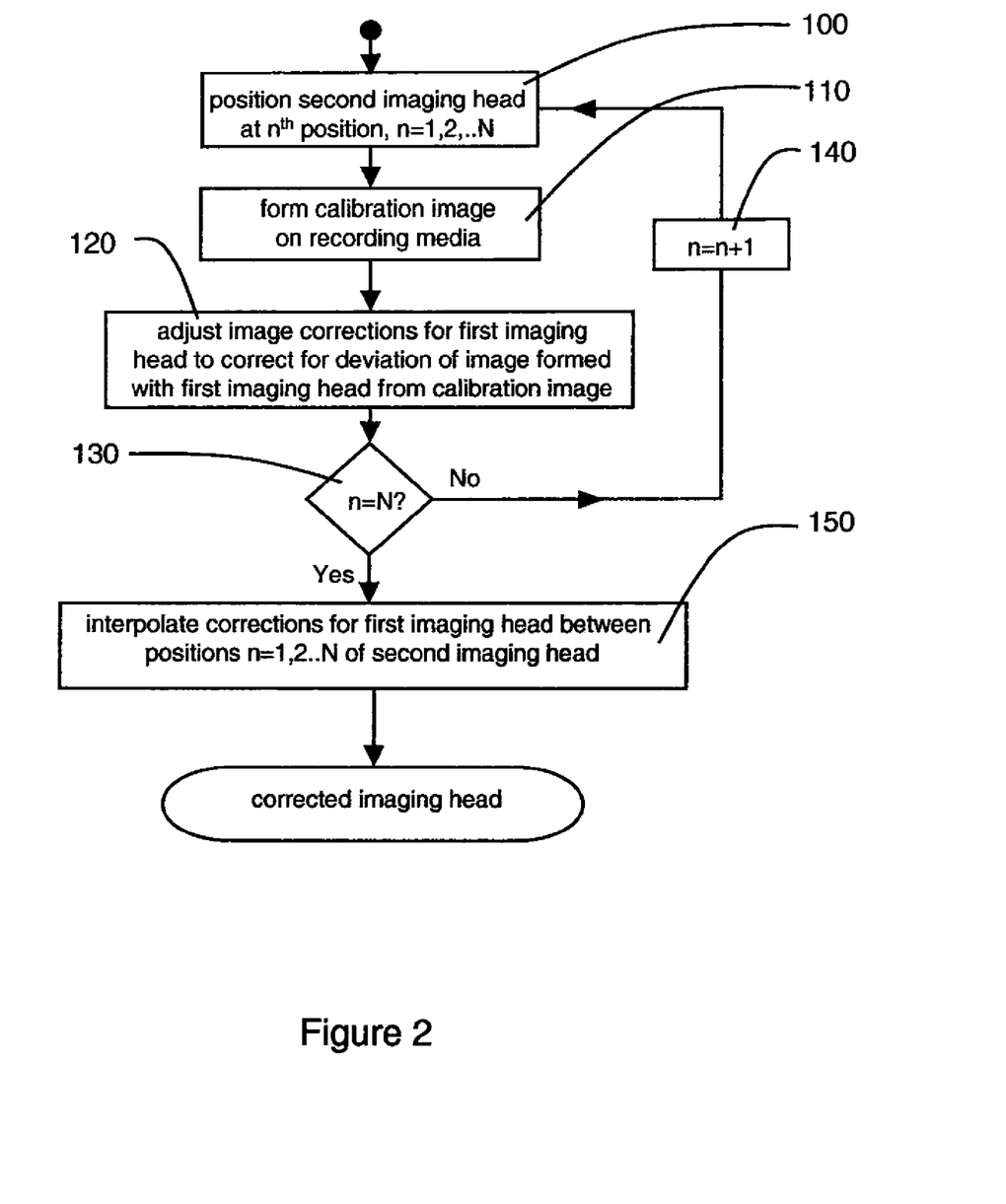
FIG. 2 is a flow chart representing a method as per an example embodiment of the invention.

FIG. 2 shows a flow chart representative of a method of calibrating a first imaging head 16 of an image recording apparatus 10 whilst allowing for the deviations caused by the positioning of a second imaging head 46, followed by calibrating a second imaging head 46 of image recording apparatus 10 whilst allowing for the deviations caused by the positioning of the first imaging head 16, as per an example embodiment of the invention. The various steps illustrated in FIG. 2 are described with reference to apparatus 10 shown in FIG. 1. This is for the purposes of illustration only and other suitable imaging apparatus can be used in the present invention.

In step 100, as shown in FIG. 2, the method of the present invention proceeds by positioning second imaging head 46 at a known first of N positions, where N is the integer number of different positions of second imaging head 46 for which corrections are to be made for the deviations induced by the varying positioning of second imaging head 46 in the imaging performed by first imaging head 16.

Figure 3:
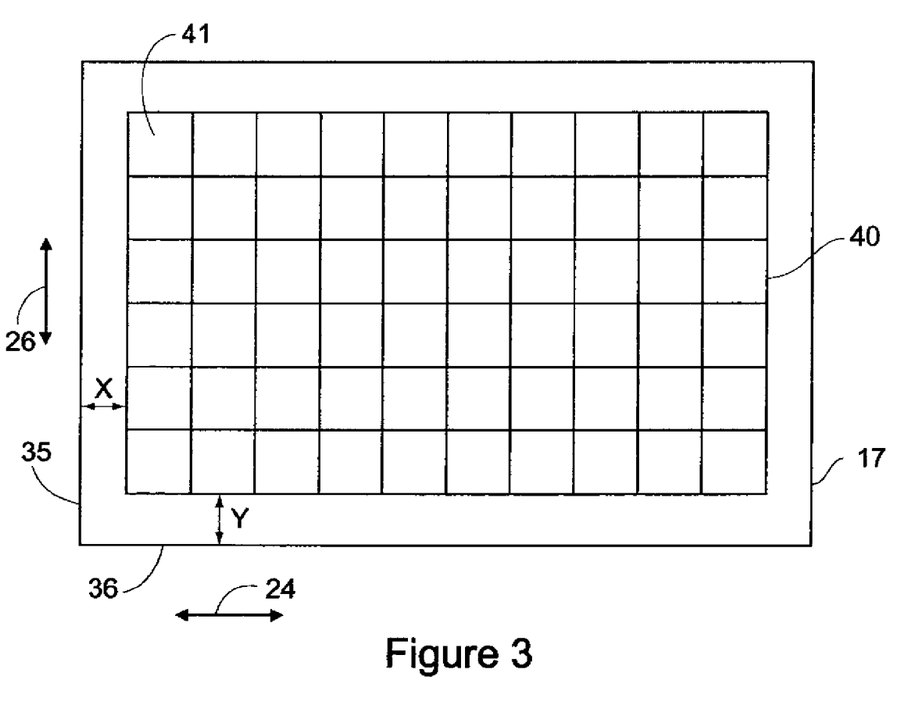
FIG. 3 is a schematic plan view of a target image to be formed on a recording media.

In step 110, apparatus 10 is used to form a target image on recording media 17. Various target images can be used in step 110. One such image is shown in FIG. 3. In this example, target image 40 comprises a regular grid pattern made up of target cells 41 which are defined by image boundaries of a desired size. In this example embodiment, target cells 41 are square shaped. Target image 40 is represented in a desired alignment with various edges of recording media 17. Specifically, it is desired to form target image 40 by a distance X from edge 35 and by a distance Y from edge 36. It is desired to form target image 40 in an aligned relationship with main-scan axis 26 and sub-scan axis 24.

Target image 40 is represented by image data 37 (see FIG. 1) and is provided to controller 30 to form an image on recoding media 12. Controller 30 controls imaging heads 16 and 46 to direct imaging beams 21 to form image 19A while scanning over recording media 17. In this example embodiment of the invention, controller 30 controls motion system 22 to create relative motion between imaging heads 16 and 46 on the one hand, and recording media 17 on the other during the imaging. In this example embodiment of the invention, imaging heads 16 and 46 are translated in a coordinated manner with the rotation of media support 12 to form helically-oriented image swaths.

Figure 4:
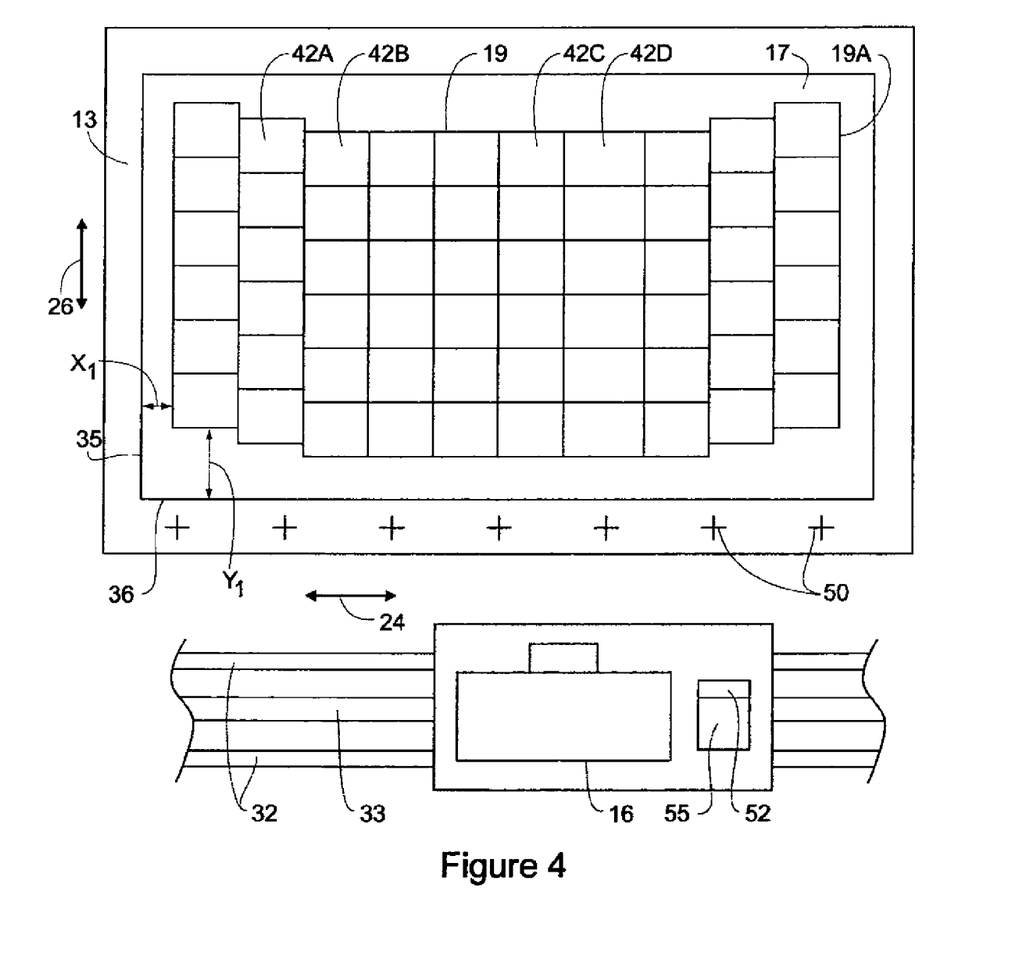
FIG. 4 is a schematic plan view of a the target image of FIG. 3, as formed on a recording media mounted on a media support.

FIG. 4 schematically shows an example calibration image 19 formed on recording media 17 in response to the desired imaging of target image 40 of FIG. 3 by first imaging head 16. While first imaging head 16 is singled out here for the sake of clarity, the method also holds for imaging head 46. Recording media 17 is shown mounted on surface 13 of media support 12. For the sake of clarity, recording media 17 and media support surface 13 are depicted in a "flat" orientation. It is to be understood that media support surface is cylindrical in nature in this example embodiment of the invention. As shown in FIG. 4, calibration image 19 does not correspond exactly to target image 40. Various imaging distortions appear in different areas of calibration image 19. Imaged cells such as imaged cells 42A, 42B, 42C and 42D (collectively referred to as imaged cells) do not correspond exactly to the pattern of target cells 41. For example, imaged cell 42A is shifted in a main-scan direction with respect to imaged cell 42B. FIG. 4 also shows that image cell 42D is elongated in size as compared to image cell 42C. Further, all of the imaged cells 42A-D are elongated in size in a sub-scan direction as compared with target cells 41. FIG. 4 shows that the overall scale of imaged cells 42A-D does not match the required scale of target cells 41. FIG. 4 also shows that calibration image 19 is respectively displaced from edges 35 and 36 by distances $X_1$ and $Y_1$ which differ from desired distances X and Y.

Figure 5A:
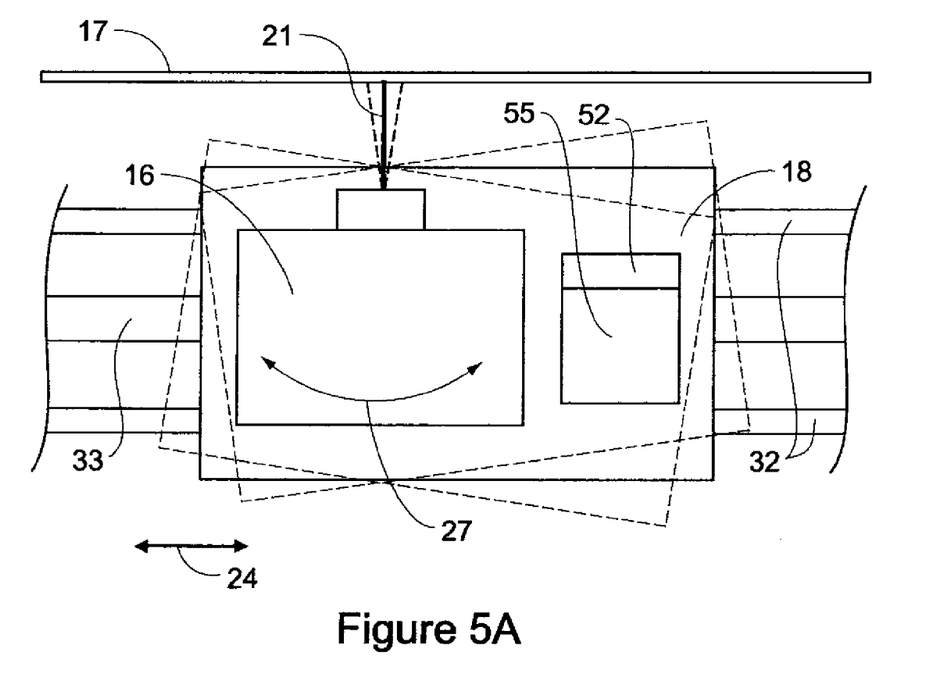
FIG. 5A shows a possible causes for sub-scan deviations of the projection point of imaging beams.

Positional and size distortions can occur for several reasons. For example, overall scaling problems can arise from temperature variances. One, or more of recording media 17, media support 12 and various transmission components such as transmission member 33 can include different material compositions that have different coefficients of thermal expansion. Different expansion rates can lead to scaling problems. Carriage 18 moves along a guide system 32 that is not perfect in form. Guide system 32 can include various suitable guide tracks and guided members that can include sliding or rotational moving bearing elements. Imperfections can be present even when high precision components are used. Mechanical factors, such as guided member-to-guide track play, guide track straightness and sag in support 20 can lead to imaging imperfections As carriage 18 moves along a path aligned with sub-scan axis 24, mechanical factors can subject first imaging head 16 to various additional motions that can adversely impact the projection of imaging beams 21 onto recording media 16. Imaging imperfections can be visualized with reference to FIGS. 5A and 5B. FIG. 5A shows a possible cause for sub-scan deviations in the projection of imaging beams 21 onto recording media 17. In this case, carriage 18 undergoes small yawing rotations (exaggerated for the sake of clarity) along yaw directions 27 as it moves along a path aligned with sub-scan axis 24. This causes variations in the projection of imaging beams 21 onto recording media 17 which can cause distortion of formed images in a sub-scan direction. Yaw motions of carriage 18 can arise for numerous reasons including play in guide system 32. Further, imperfections in other components can lead to sub-scan deviations. For example, transmission member 33 can comprise a precision lead screw, which can have slight pitch irregularities at various points along its length. Pitch irregularities can cause distortion of formed images in a sub-scan direction.

Figure 5B:
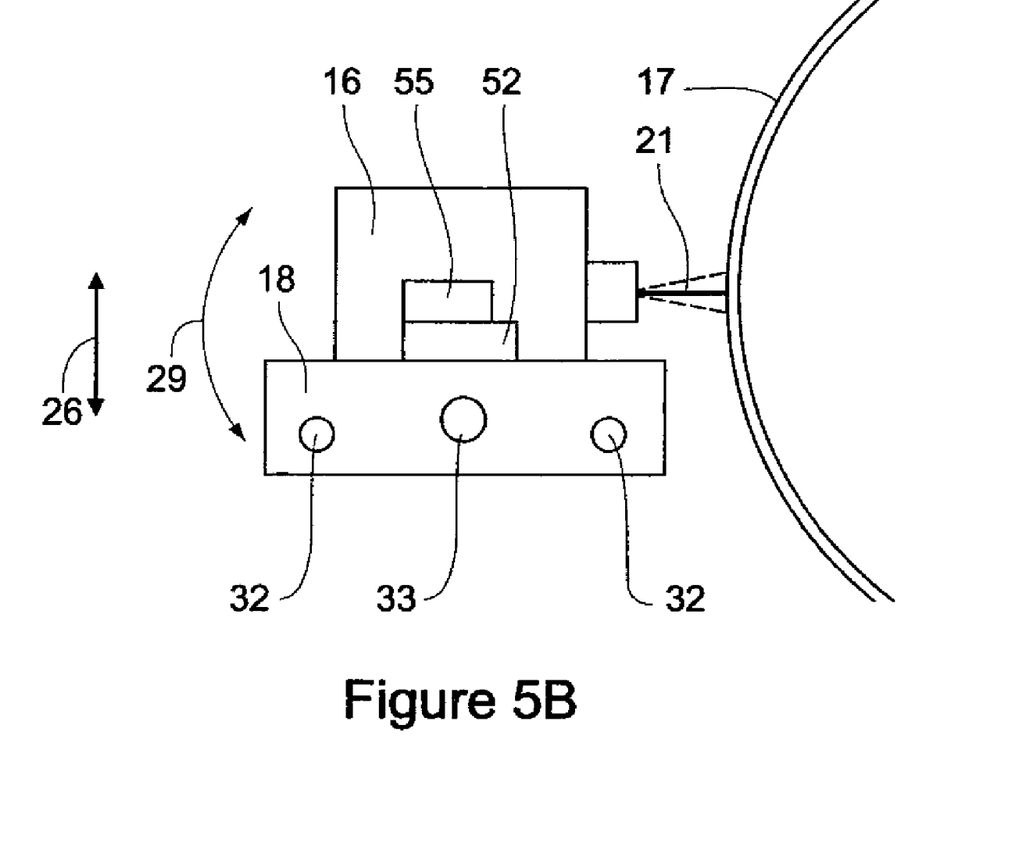
FIG. 5B shows possible causes for main-scan deviations of the projection points of imaging beams.

FIG. 5B shows possible causes for main-scan deviations in the projection of imaging beams 21 onto recording media 17. While we single out first imaging head 16, the deviations and corrective method hold also for imaging head 46. Main-scan deviations can arise for different reasons. For example, as carriage 18 moves along guide system 32 it may undergo small displacements aligned with main-scan axis 26. The small displacements can be caused by various factors, which can include play in guide system 32, and deviations in the guide tracks including gravitational sag in the tracks and gravitational sag in support 20. Main-scan deviations can be caused as carriage 18 undergoes small pitching rotations, (exaggerated for the sake of clarity) along pitch directions 29 and also as the carriage 18 moves along a path aligned with sub-scan axis 24. Pitch displacements can be caused by numerous reasons including play in guide system 32.

The mass of first imaging head 16 itself, particularly in large machines, induces a displacement along the main-scan direction of the image formed by first imaging head 16. The chief distortion in the image produced by first imaging head 16 as a result of the positioning of second imaging head 46 is likewise that of displacement of the image along the main-scan direction, being due to the mass of second imaging head 46.

Those skilled in the art will realize that the image distortions described are exemplary in nature and that other types of distortion can occur. In the dual imaging head arrangement of FIG. 1, the image distortions associated with first imaging head 16 will be different for different positions of second imaging head 46. While most of the variation occurs along the main-scan direction as a result of the weight of carriage 48 and second imaging head 46, the effect is not limited to the main-scan direction and some sub-scan direction displacement can occur. Similarly, in the dual imaging head arrangement of FIG. 1, the image distortions associated with second imaging head 46 will be different for different positions of first imaging head 16.

In step 120, apparatus 10 is adjusted to correct for the deviations in calibration image 19 produced by first imaging head 16. Deviations can be corrected by various methods. In some example embodiments of the invention, main-scan distortions such as the shifts between imaged cells 42A and 42B can be corrected by adjusting an activation timing of the imaging channels. Although the activation of a given imaging channel to form or not form an image pixel is dependent on image data, the timing of the activation of the given channel can be adjusted. Adjustments of the activation timing of various channels can be used to delay or advance the activation of those channels to form or not form one or more image pixels. Various channels can be controlled to offset a first portion of an imaged swath with respect to an additional portion of the imaged swath in a main-scan direction. A portion of a given imaged swath can be offset from a portion of an additional imaged swath. A portion of an imaged swath can include the entirety of the imaged swath. The activation timing of various channels of first imaging head 16 can be adjusted at various positions as first imaging head 16 is moved along a path aligned with sub-scan axis 24. The distortion of images formed at these various positions can be corrected by activation timing adjustments at these positions. In this example embodiment of the invention, activation-timing changes are made independently of image data 37. Controller 30 can be programmed to provide signals to first imaging head 16 to adjust activations timing of its imaging channels. Motion system 22 can include suitable sensors, which can generate various signals representative of a position of first imaging head 16 and/or media support 12. In some example embodiments of the invention, sensor signals can be used by controller 30 to adjust activation timings of various channels. Activation timing adjustments can also be made to adjust the position of calibration image 19 from edge 36.

Sub-scan distortions such as elongated imaged cells 42D can be corrected by various methods. In some example embodiments of the invention, the movement of carriage 18 is adjusted. In some example embodiments of the invention, the movement of transmission member 33 is adjusted. Adjusting the movement of carriage 18 or transmission member 33 can include adjusting a speed of carriage 18 or transmission member 33. For example, in a drum based imaging system (e.g. apparatus 10) spiral or helical image swaths are formed as the carriage 18 is translated while media support 12 is rotated. By adjusting the speed of transmission member 33 or carriage 18, the pitch of the helical swaths can be adjusted to scale the image to a desired size. In some example embodiments of the invention, uniform speed adjustments can be used to adjust the overall size of a formed image. In some example embodiments of the invention, non-uniform speed adjustments can be used to adjust the size of a part of the formed image. For example, adjusting a speed of transmission member 33 at various points along the motion path of carriage 18 can be used to correct image deviations corresponding to those points. Adjusting a speed of transmission member 33 at various points along the motion path of carriage 18 can be used to correct for pitch discrepancies. Adjusting a speed of transmission member 33 at various points along the motion path of carriage 18 can be used to correct head yaw displacements. Adjustments can also be made to adjust the position of an image in a sub-scan direction. For example, adjustments can be used to adjust a position of calibration image 19 from edge 35.

Controller 30 can be programmed to provide signals to motion system 22 to adjust a movement of carriage 18 or transmission member 33. In some example embodiments of the invention, sensor signals can be used by controller 30 to adjust a movement of carriage 18 or transmission member 33.

In step 130, it is ascertained whether the deviations in the imaging by first imaging head 16 has been corrected for all N positions of second imaging head 46. If it has, then the method proceeds to step 150. If it has not, then the counter n is increased to n+1 in step 140, and the corrective calibration process as described by step 120 is performed for this new position of second imaging head 46. The process is repeated until the imaging by first imaging head 16 has been corrected for all chosen positions of second imaging head 46, at which point step 130 registers a result of n=N.

In step 150, the corrections to the imaging by first imaging head 16 at positions of second imaging head 46 between n and n+1 are determined by interpolation. The corrections may be stored as lookup tables or may be stored as corrective algorithms or functions. The method may now be repeated for different positions of first imaging head 16 so that, for every position of first imaging head 16, imaging corrections are known for all possible positions of second imaging head 46.

The method of the invention can be extended to imaging systems having more than two imaging heads, in which case the imaging for a given imaging head had to be adjusted for the positions of more than one other imaging head.

A reduction in the complexity of the operation may be devised by operating the two imaging heads 16 and 46 so that they are always in a known mutual positional relationship along sub-scan axis 24. The corrections for the two imaging heads 16 and 46 are then only required as a function of the position of the particular imaging head being calibrated, the position of the other imaging head being functionally known, even if it is not at a fixed distance from the first imaging head. This reduces the access to any lookup tables involved.

In one embodiment of the present invention, carriages 18 and 48 are not advanced continuously in the subscan direction to cause imaging heads 16 and 46 to write a helical path, but are, instead, moved to discrete subscan positions and the media support 12 is rotated to cause imaging heads 16 and 46 to write a circular path. These are referred to as "step-and-repeat" systems. Adjustments to the imaging of imaging heads 16 and 46 for "step-and-repeat" systems are performed not by adjusting the subscan speed of carriages 18 and 48, but by adjusting the positions to which they are instructed to relocate themselves.

Co-pending U.S. Patent Publication 2008/0299470, herewith incorporated in full, describes a method to adapt the calibration of apparatus 10 by adjusting the imaging corrections to allow for geometric distortion. To this end permanent reference features 50 are provided on surface 13 of media support 12. In an embodiment of the present invention shown in FIG. 6, the imaging corrections for first imaging head 16, located at a given subscan position, due to second imaging head 46 being in a particular subscan position are determined by detecting a reference feature 50 at or near to the position of first imaging head 16 using illuminator 55 and sensor 52. Controller 30 compares the newly determined positions of reference features 50 against the previously determined positions. If during this comparison, a change in an expected position of a detected reference feature 50 is noted, then controller 30 adjusts the imaging corrections in accordance with this change. A determined position of reference feature 50 is thereby obtained. The determined position of the reference feature is then compared with an expected position for the same reference feature. The imaging corrections of imaging head 16, while the latter is located at the given subscan position, are then derived from the difference between the determined position and the expected position. The method is repeated for different positions of second imaging head 46, while first imaging head 16 is kept in the given subscan position. The process is repeated for first imaging head 16 placed at other subscan positions. By the same method, imaging corrections for second imaging head 46 due to first imaging head 16 being at different possible positions may be made for all possible positions of second imaging head 46.

The method comprises applying the same process with the roles of first imaging head 16 and second imaging head 46 interchanged, thereby providing imaging corrections for imaging head 46 at a set of subscan positions for different positions of first imaging head 16 in each case. In this case illuminator 65 and sensor 62 are employed.

Figure 6:
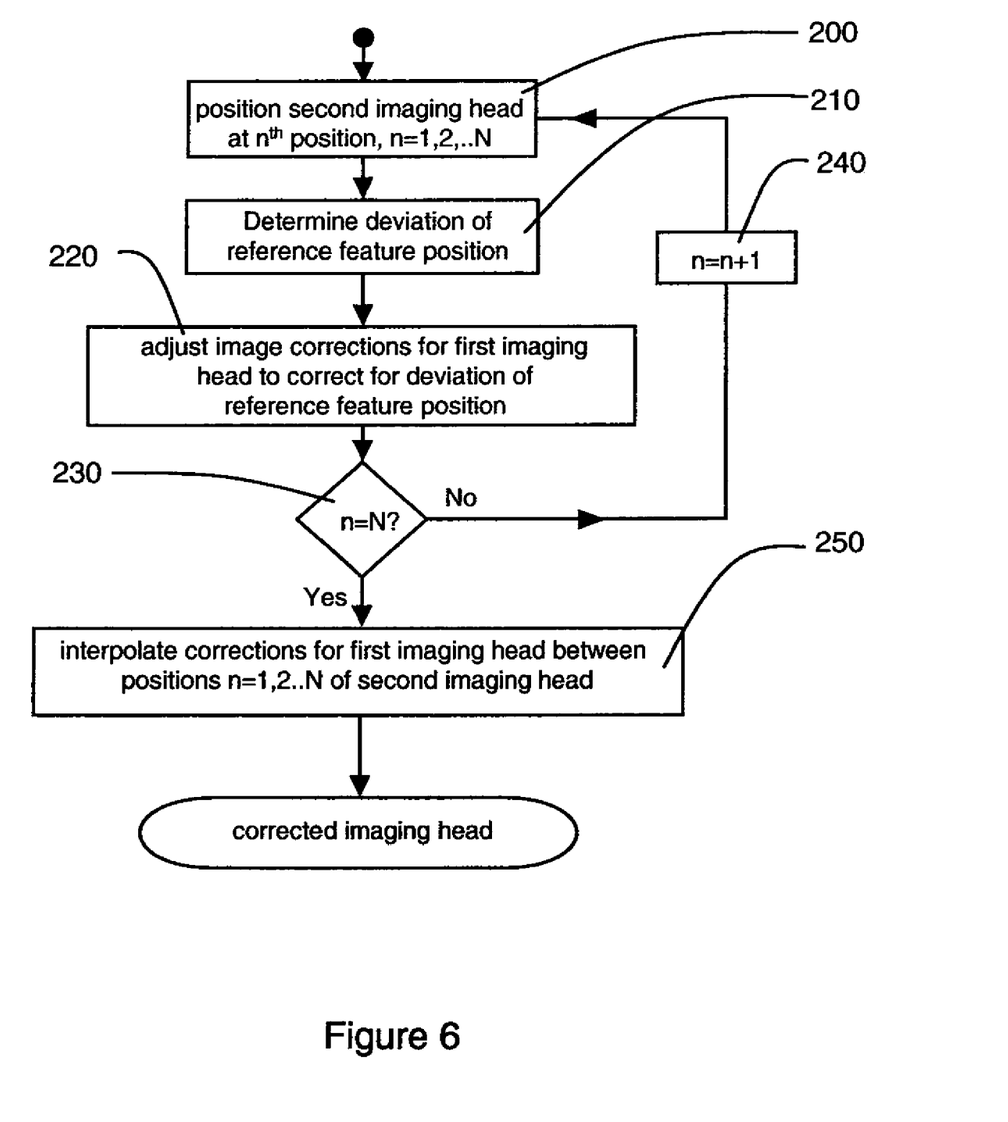
FIG. 6 is a flow chart representing a method as per an example embodiment of the invention.

FIG. 6 is a flow diagram of this embodiment of the method of the present invention. In step 200, second imaging head 46 is positioned at an $n^{th}$ position, where n=1, 2, . . . N. The deviation of a reference feature 50 from an expected position is determined in step 210 using sensor 52. The image corrections to imaging head 16 are made in step 220 to correct for the deviation of reference feature 50 due to the positioning of first imaging head 46.

In step 230, it is ascertained whether the deviation in the imaging by first imaging head 16 has been corrected for all N positions of second imaging head 46. If it has, then the method proceeds to step 250. If it has not, then the counter n is increased to n+1 in step 240, and the corrective calibration process as described by steps 210 and 220 is performed for this new position of second imaging head 46. The process is repeated until the imaging by first imaging head 16 has been corrected for all chosen positions of second imaging head 46, at which point step 230 registers a result of n=N.

In step 250, the corrections to the imaging by first imaging head 16 at positions of second imaging head 46 between n and n+1 are determined by interpolation. The corrections may be stored as lookup tables or may be stored as corrective algorithms or functions. The method may now be repeated for different positions of first imaging head 16 so that, for every position of first imaging head 16, imaging corrections are known for all possible positions of second imaging head 46. By the same method, imaging corrections for second imaging head 46 due to first imaging head 16 being at different possible positions may be made for all possible positions of second imaging head 46.

In various embodiments of the invention, sensors 52 and 62 can include any suitable sensor for detecting a reference feature 50. In some example embodiments of the invention, illuminators 55 and 65 are used to illuminate a reference feature 50 while it is detected. In some example embodiments of the invention, one or more imaging beams 21 emitted by imaging head 16 are used to detect reference features 50. Imaging beams from imaging head 46 may also be employed to detect reference features 50. Reference features 50 can include various shapes and forms suitable for detection by sensors 52 and 62. Without limitation, reference features 50 can include various registration marks or fiducial marks. Reference features 50 can include cross-hairs, diamond shapes, circular shapes and the like.

It is to be understood that the exemplary embodiments of the invention are merely illustrative and that those skilled in the art can devise many variations of the described embodiments without departing from the scope of the invention.

PARTS LIST 10 apparatus
12 media support
13 surface
16 imaging head
17 recording media
18 carriage
19A image
19 calibration image
20 support
21 imaging beams
22 motion system
24 sub-scan axis
26 main-scan axis
27 yaw directions
28A clamps
28B clamps
29 pitch directions
30 controller
32 guide system
33 transmission member (for carriage 18)
34 transmission member (for carriage 48)
35 edge
36 edge
37 image data
40 target image
41 target cells
42A imaged cells
42B imaged cells
42C imaged cells
42D imaged cells
46 imaging head
48 carriage
50 reference features
52 sensor
55 illuminator
62 sensor
65 illuminator
100 step
110 step
120 step
130 step
140 step
150 step
200 step
210 step
220 step
230 step
240 step
250 step
X distance
$X_1$ distance
Y distance
$Y_1$ distance

The invention claimed is:

1. A method for changing the calibration of an imaging system comprising a plurality of imaging heads, the method comprising:
    adjusting the imaging of a first imaging head of the plurality of imaging heads based on a position of at least a second imaging head of the plurality of imaging heads;
    placing the at least a second imaging head in a first position and determining a first adjustment to be made to the imaging of the first imaging head;
    placing the at least a second imaging head in a second position and determining a second adjustment to be made to the imaging of the first imaging head; and
    determining a third adjustment to be made to the imaging of the first imaging head by interpolating between the first adjustment and the second adjustment.

2. The method of claim 1, wherein the first imaging head comprises a first plurality of addressable channels and the adjusting the imaging of the first imaging head comprises adjusting the activation timing of at least one of the first plurality of channels.

3. The method of claim 1, wherein the adjusting the imaging of the first imaging head comprises adjusting at least one of the position and the speed of the first imaging head.

4. The method of claim 1, comprising adjusting the imaging of the second imaging head of the plurality of imaging heads based on a position of at least the first imaging head of the plurality of imaging heads.

5. The method of claim 1, wherein the adjustment made to the first imaging head and the position of the at least a second imaging head are entered in a lookup table.

6. The method of claim 1, comprising relating the adjustment made to the first imaging head to the position of the at least a second imaging head by at least one of an analytical relationship and an algorithm.

7. The method of claim 1, wherein the adjustment made to the first imaging head is in accordance with a change in an expected position of a detected reference feature.

8. The method of claim 1, wherein the adjustment made to the first imaging head is in accordance with a change in an expected position of a feature written by the first imaging head.

* * * * *